(12) United States Patent
Dlugoleski

(10) Patent No.: US 6,966,119 B1
(45) Date of Patent: Nov. 22, 2005

(54) THREE SIDED ADJUSTABLE LEVEL AND ASSEMBLY

(76) Inventor: Michael Dlugoleski, 28 Wadhams Ave., Torrington, CT (US) 06790

(*) Notice: Subject to any disclaimer, the term of this patent is extended or adjusted under 35 U.S.C. 154(b) by 2 days.

(21) Appl. No.: 10/807,875

(22) Filed: Mar. 25, 2004

Related U.S. Application Data

(60) Provisional application No. 60/456,919, filed on Mar. 24, 2003.

(51) Int. Cl.[7] .............................. E04F 21/00; B43L 7/14
(52) U.S. Cl. ............................ 33/194; 33/451; 33/464; 33/562
(58) Field of Search ........................ 33/194, 197, 404, 33/427, 451, 464, 474, 481, 562, 613, 645; 52/204.1

(56) References Cited

U.S. PATENT DOCUMENTS

| | | | |
|---|---|---|---|
| 1,101,517 A * | 6/1914 | Ahlvin .................. | 33/194 |
| 2,058,330 A | 10/1936 | Little | |
| 2,332,347 A | 10/1943 | Schaefer et al. | |
| 2,761,215 A | 9/1956 | Macklanburg | |
| 2,973,584 A * | 3/1961 | Snapp .................. | 33/194 |
| 3,059,341 A * | 10/1962 | Becker .................. | 33/197 |
| 3,102,345 A * | 9/1963 | Holland ................ | 33/194 |
| 3,930,315 A | 1/1976 | Baskett | |
| 4,218,829 A | 8/1980 | Wightman | |
| 4,733,475 A | 3/1988 | Youmans | |
| 4,813,149 A | 3/1989 | Herkimer | |
| 4,910,876 A | 3/1990 | Channell | |
| 5,353,509 A | 10/1994 | Black | |
| 5,713,135 A | 2/1998 | Acopulos | |
| 5,813,125 A | 9/1998 | Byrn | |
| 6,237,233 B1 | 5/2001 | Cloutier et al. | |
| 6,282,852 B1 * | 9/2001 | Walcker ................ | 33/194 |
| 6,305,092 B1 | 10/2001 | Tufariello | |
| 6,442,853 B1 | 9/2002 | Hale et al. | |
| 6,530,186 B2 * | 3/2003 | Torstensen ............. | 33/194 |
| 6,615,500 B2 | 9/2003 | Hale et al. | |
| 2002/0170189 A1 | 11/2002 | Cheatham | |
| 2003/0005589 A1 * | 1/2003 | Hale et al. ............. | 33/194 |

* cited by examiner

Primary Examiner—G. Bradley Bennett
(74) Attorney, Agent, or Firm—Deborah A. Basile; Karen K. Chadwell

(57) ABSTRACT

Disclosed herein is a level comprising a horizontal component comprising a first terminal end and a second terminal end; a first vertical component comprising an end joined to the first terminal end of the horizontal component, wherein the first vertical component is attachable to a first vertical side of a jamb; and a second vertical component comprising an end joined to the second terminal end of the horizontal component, wherein the second vertical component is attachable to a second vertical side of a jamb; wherein the level squares, levels, and plumbs the jamb. Further disclosed herein is an assembly comprising two levels disposed on a jamb such that the sides of the jamb are held rigid and secure, and the angles of the jamb are held at a constant angle to increase the ease of installation of the jamb.

14 Claims, 6 Drawing Sheets

THREE SIDED ADJUSTABLE LEVEL AND ASSEMBLY

CROSS REFERENCE TO RELATED APPLICATIONS

This application claims the benefit of U.S. Provisional Application No. 60/456,919 filed on Mar. 24, 2003.

BACKGROUND OF THE INVENTION

1. Field of the Invention

The present invention relates to a device used to assist in the installation of a jamb, wherein the jamb may comprise, for example, a doorjamb, a window jamb, a fireplace jamb, and the like. More specifically, the invention relates to a device that decreases the overall length of time needed to properly install a jamb. The device has features which allow the installer to level the horizontal surfaces of the jamb and plumb the vertical surfaces of the jamb simultaneously.

2. Background of the Invention

In the field of carpentry, the task of installing a doorjamb in a door opening in a wall is a challenging one. The task requires precision because the proper and effective use of the door depends upon a proper installation. Current processes for installing a doorjamb, however, are imprecise. In general, current methods involve holding the doorjamb in place and, while securing one side of the doorjamb, measuring the level of the horizontal member of the doorjamb while trying to hold the vertical members still and square. Installation is made more difficult because the doorjamb is not secure. Rather, the doorjamb wobbles and its angles are movable and inexact. The process of installing the doorjamb in the wall may take over an hour of work by one or two skilled carpenters trying to obtain level and plumb sides prior to securing the doorjamb in the wall and prior to shimming the space between the doorjamb and the wall. If one of the four angles of the jamb is not square, the others are also not square and the vertical or horizontal members are not level or plumb. Such inaccuracy in installation invariably results in a door that does not hang squarely in the doorjamb, and that, therefore, will not open and close properly.

Others have attempted to solve the problems inherent with doorjamb installation. However, to date there is no device comprising all of the features found in the present invention. The prior art discloses devices that assist in aligning the doorjamb and which assist in spreading the horizontal members of the doorjamb during installation. There are devices which provide a hands free square and a level of one dimension which can be used to square and level one corner of the doorjamb at a time. Additionally, the prior art includes various adjustment apparatus which are four sided and which fit within the doorjamb and which are used to stabilize the four surfaces of the doorjamb but which do not secure and fix both the horizontal planes and the top vertical planes simultaneously. The pertinent disclosed art is analyzed further below.

U.S. Pat. No. 6,615,500 to Hale teaches a device that attaches to a doorjamb and that allows the installer to read both level and plumb simultaneously. Hale's device has swing out tabs that are pivotally attached to the device and that are connected by screws to the wall and are used to hold the doorjamb temporarily in place. Hale's device is attached to the doorjamb with a screw or a nail installed through a front facing edge of the doorjamb, which is only 5/8 inch wide, making it highly likely to split. And although Hale's device is capable of reading both level and plumb simultaneously, it only reads level and plumb on one side of the doorjamb at a time. Thus the device must be moved from one side of the doorjamb to the other in order to obtain square, level and plumb entirely.

As stated, Hale has "swivel out tabs" which temporarily attach the doorjamb to the outer wall. The tabs have one screw hole for attachment to the wall so that once the device is attached, it can not be moved or adjusted. The present invention has tabs which contain a long slot in them making them able to slide back and forth after being attached to the wall. This allows for continuous adjustment after the device is secured within the wall opening.

U.S. Application Serial No. 2002/0170189 to Cheatham (now abandoned) teaches a device that provides the ability to spread open and adjust a doorjamb to different widths. Cheatham's device provides the ability to read both level and plumb simultaneously. However, Cheatham's device must be held by hand up against the doorjamb not allowing the installer to use his hands to move the doorjamb around to adjust it. If a user was to remove his hands from the device, the device would fall out of the doorjamb and would be of no use. Additionally, although Cheatham is capable of allowing the installer to read both level and plumb simultaneously, the level bubbles are too close together and not far enough down plane to get an accurate reading. Accordingly, this requires more time to get further readings by actually moving the device by hand along the length of the doorjamb.

U.S. Pat. No. 2,058,330 to Little teaches a device capable of maintaining two 90 degree angles and is capable of reading both level and plumb simultaneously. Although Little teaches a device which is capable of maintaining two ninety degree corners, it is not capable of mounting to the doorjamb and keeping both corners in a locked secure position simultaneously. It is capable of measuring both level and plumb simultaneously, but it cannot do so without the installer physically holding the device.

U.S. Pat. No. 5,813,125 to Byrn provides the ability to maintain a one ninety degree corner and to attach to the doorjamb and allow the installer to read both level and plumb simultaneously. Byrn is not capable of locking the lower ends of the doorjamb into a fixed angle position. Byrn is able to attach to the doorjamb, however, it requires attachment both at the side of the jamb and on the top of the jamb leaving twice as many holes in the jamb to be repaired later. Byrn is able to read both level and plumb simultaneously although the readings become less accurate the further down the plane you get away from the corners because the bubbles do not extend out far enough away from the corners.

U.S. Pat. No. 6,237,233 to Cloutier et al. teaches a device which is only fixed on one side to the hinges of the door frame. The tabs are removable to slide and secure into the frame or into the wall. The non-hinge side of the door is free floating and the carpenter must install and manually level that side into the frame.

Accordingly, what is still needed is a device that can simplify the process for installing doorjambs such that a door can be properly fitted within the doorjamb. Such a device will preferably allow a user to simultaneously level and plumb the doorjamb during installation, thereby decreasing the amount of time needed to properly install the doorjamb.

SUMMARY OF THE INVENTION

The above described problems are eliminated or greatly reduced by a level comprising a horizontal component comprising a first terminal end and a second terminal end; a first vertical component comprising an end joined to the first terminal end of the horizontal component, wherein the first vertical component is attachable to a first vertical side of a jamb; and a second vertical component comprising an end joined to the second terminal end of the horizontal component, wherein the second vertical component is attachable to a second vertical side of a jamb; wherein the level squares, levels, and plumbs the jamb. Further disclosed herein is an assembly comprising two levels disposed on a jamb such that the sides of the jamb are held rigid and secure, and the angles of the jamb are held at a constant angle to increase the ease of installation of the jamb.

An object of the present invention is to provide a convenient, lightweight portable device to assist in the installation of a doorframe within a wall.

A further object of the present invention is to allow the horizontal and vertical members of the doorjamb to be leveled and plumbed simultaneously.

A further object of the present invention is to secure, fix, level and plumb all four angles of the door jam simultaneously to assist in the installation of the door jam into the wall.

A further object of the present invention is to provide a squaring, level and plumbing device which allows the installer to actually install the door on the hinges while the device is in place to test the door to be sure that it opens and closes smoothly and to determine that it is perfectly installed prior to removing the device.

A further object of the present invention is to provide a squaring, leveling and plumbing device which allows the installer to actually shim around the jamb, between the jamb and the wall while the device is in place to insure the level of all surfaces throughout installation.

DETAILED DESCRIPTION OF THE INVENTION

Figure 1:
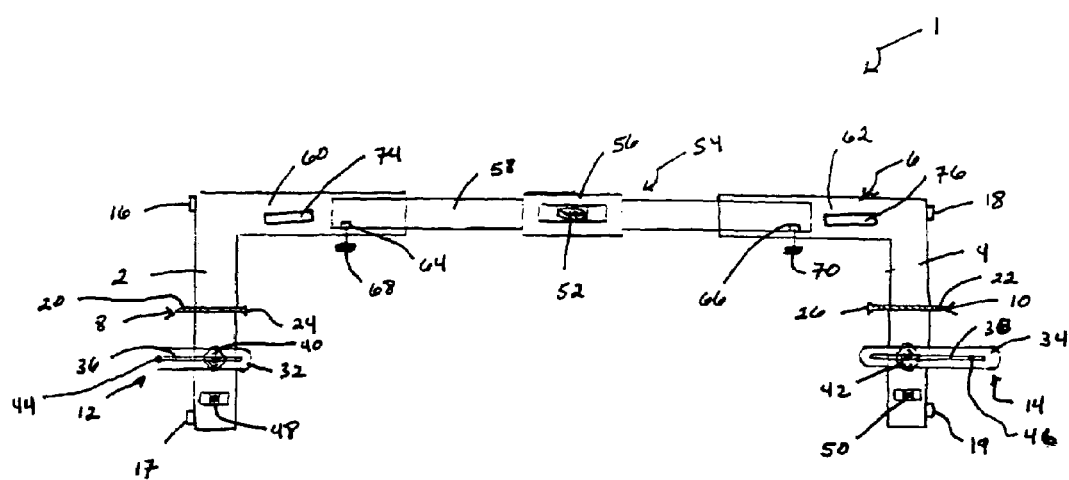
FIG. 1 is an illustration depicting a font side view of an exemplary level.

The length of time that it takes to install a doorjamb is excessive and it is the goal of the level, as disclosed herein, to decrease the installation time and to ease the process of plumbing and leveling a doorjamb within a doorframe. Although the level will be herein described in its application to a doorjamb, the level can be used just as well, and in like manner, to any jamb as is known in the art, such as, for example, a window jamb or a fireplace jamb.

The level disclosed herein makes the doorjamb square and rigid, so that it is properly dimensioned and cannot wobble. In this way, installation and leveling is made easier. That is, installation of a doorjamb using the level as disclosed herein reduces the installation time by up to about 70 percent over current installation methods.

In an exemplary embodiment, the level comprises two vertical components, wherein each of the two vertical components is joined opposite from each other to the terminal ends of a horizontal component. The angles formed between the horizontal component and each of the two vertical components is preferably 90 degrees. In a preferred embodiment, the vertical components and the horizontal component of the level each comprises a main body, which is manufactured from any lightweight material including wood, aluminum, PVC, or any other suitable material.

Preferably, each of the two vertical components comprises a plurality of elements, wherein each of the elements forming the plurality serve to secure the level onto a doorjamb and/or to plumb and/or level the doorjamb with a wall. Preferably, the horizontal component comprises an adjustor means, whereby the width of the level may be adjusted to fit the width of any sized doorjamb.

Additionally, the horizontal component may comprise a handling means, whereby the level may be readily lifted by an installer. Furthermore, in an exemplary embodiment, each of the vertical components, as well as the horizontal component, comprises at least one level indicator, whereby an installer can accurately determine whether the doorjamb is both level and plumb with the wall.

In installing the doorjamb, preferably two levels are used. In a preferred embodiment, one level is positioned opposite to a second level on a doorjamb. That is, one of the levels is installed on the top of the doorjamb and snuggly fits along the top horizontal surface of the doorjamb and partially down each side of the two vertical surfaces of the doorjamb. The second level is preferably installed in an inverted manner at the bottom of the doorjamb such that each of the two vertical components of the level extends upwards along a portion of the two vertical surfaces of the doorjamb.

The invention is described more fully with reference to the Figures. However, the following detailed description in the accompanying drawings is provided for the purpose of describing presently preferred embodiments of the invention only, and is not intended to describe the only embodiments or forms in which the invention may be practiced. Accordingly, modifications and variations to the level, and to its method of use, are contemplated herein.

Referring to FIG. 1, an exemplary level 1 comprises two vertical components 2, 4 joined to a horizontal component 6. The point at which each of vertical components 2, 4 meets horizontal component 6 preferably creates an angle θ equal to 90 degrees.

Each of vertical components 2, 4 comprises a plurality of elements for securing level 1 onto a doorjamb and/or for plumbing and/or leveling the doorjamb with a wall. The plurality of elements comprises attachment screws 8, 10, slotted assemblies 12, 14, and earmarks 16–19.

Figure 3:
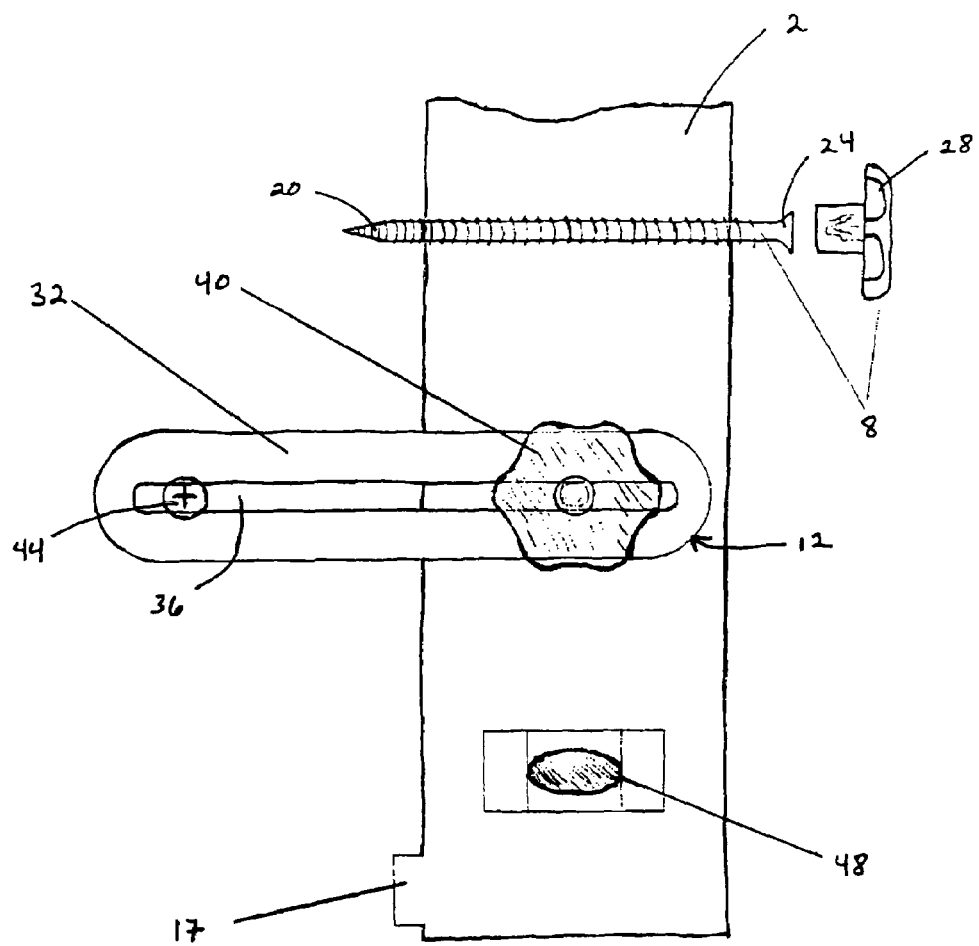
FIG. 3 is an illustration depicting exemplary vertical members of an exemplary level.

Referring to FIGS. 1 and 3, exemplary attachment screws 8, 10 bear through the interior walls of vertical components 2, 4 such that when level 1 is attached to a doorjamb, an end 20, 22 of respective attachment screws 8, 10 bears into the doorjamb, thereby securing level 1 to the doorjamb. Preferably, a head 24, 26 of respective attachment screws 8, 10 comprise a cap 28 to protect an installer from scraping himself against either of heads 24, 26.

Referring to FIGS. 1 and 3, slotted assemblies 12, 14 serve to secure level 1 onto a wall (not shown). Each of slotted assemblies 12, 14 comprises a tab 32, 34 having a horizontally directed slot 36, 38 therein. Slotted assemblies 12, 14 each further comprises an adjustor element 40, 42, wherein adjustor elements 40, 42 are positioned within respective slots 36, 38 such that tabs 32, 24 can be secured to level 1. Adjustor elements 40, 42 can be loosened such that an installer can slide tabs 32, 34 in an easterly or westerly direction such that tabs 32, 34 can extend along the surfaces of the wall. In an exemplary embodiment, each of adjustor elements 40, 42 comprises a nut and bolt. Additionally, slotted assemblies 12, 14 may comprise a securing element 44, 46, wherein securing elements 44, 46 fit through respective slots 36, 38 and further secure level 1 to the wall. An exemplary securing element comprises a screw, wherein the screw can be loosened or tightened by hand or by an ordinary manual or electric screwdriver.

Still referring to FIGS. 1 and 3, earmarks 16–19 are preferably used to flush level 1 with the outer edge of the doorjamb. That is, as will be explained in greater detail below, earmarks 16–19 allow vertical components 2, 4 to be flushed with the vertical walls of the doorjamb during installation such that level 1 can be leveled and plumbed with the doorjamb.

Again referring to FIGS. 1 and 3, each of vertical components 2, 4 and horizontal component 6 comprises a level indicator 48, 50, 52 respectively, whereby level indicators 48, 50, 52 can detect whether or not level 1 is level and plumb with the doorjamb and/or the wall. Level indicators 48, 50, 52 may comprise a conventional bubble level indicator. Level indicator 52 is preferably positioned in the center of horizontal component 6, and level indicators 48, 50 are preferably positioned towards the terminal ends of respective vertical components 2, 4 furthest away from horizontal component 6, to maximize the accuracy of the readings.

Figure 2:
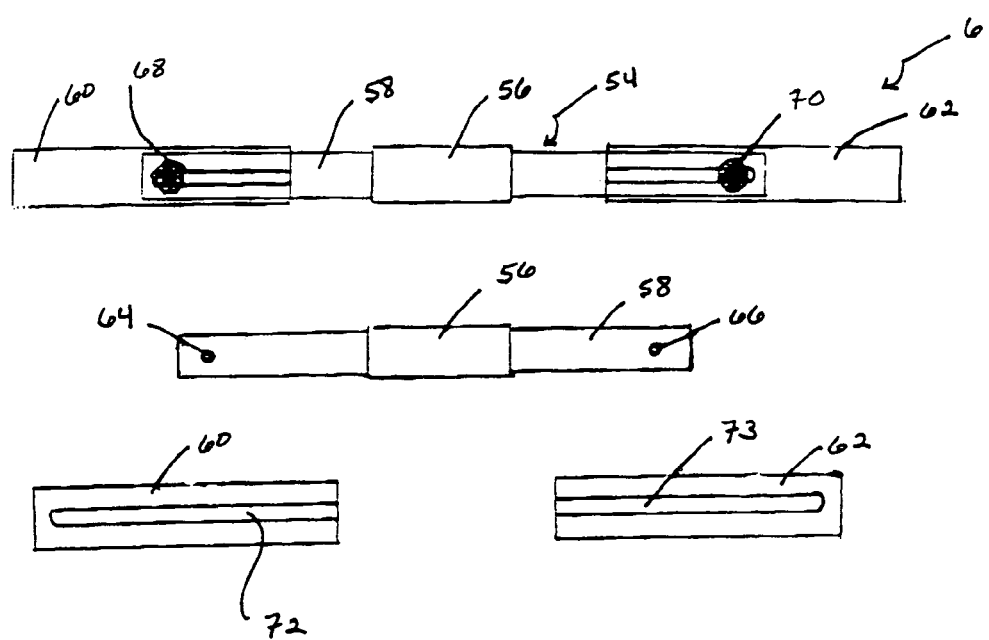
FIG. 2 is an illustration depicting a bottom view of an exemplary level.
Figure 4:
FIG. 4 is an illustration depicting an exemplary horizontal members of an exemplary level.

Referring to FIGS. 1 and 2, horizontal component 6 is preferably adjustable. Accordingly, in an exemplary embodiment, horizontal component 6 comprises a first overlying member 60 and a second overlying member 62. Horizontal component 6 further preferably comprises an adjustor means 54, whereby the width of level 1 can be adjusted to accommodate any sized doorjamb. Adjustor means 54 comprises a connector 56 overlying an underlying element 58. Underlying element 58 may have level indicator 52 incorporated thereto, wherein level indicator 52 is seen through an opening or transparent section of connector 56. Overlying members 60, 62 can fit around underlying member 58. Overlying members 60, 62 each preferably comprises an adjustment slot 72, 73 respectively. Additionally, underlying element 58 comprises receivers 64, 66. Knobs 68, 70 (See FIGS. 1, 2, and 4) can be inserted through respective adjustment slots 72, 73 and threaded through receivers 64, 66 respectively to fix overlying members 60, 62 to underlying member 58.

Therefore, the length of horizontal component 6 can be altered by loosening knobs 68, 70 and sliding at least one of first overlying member 60 and/or second overlying member 62 away from connector 56 until first overlying member 60 and/or second overlying member 62 contacts the vertical wall(s) of the doorjamb. Once both side walls of horizontal component 6 contact the vertical walls of the doorjamb, knobs 68, 70 are preferably inserted through respective adjustment slot 72, 73, and securely received into respective receivers 64, 66. Knobs 68, 70 may then be tightened to prevent first and second overlying members 60, 62 from sliding about underlying element 58.

In an exemplary embodiment, at least one of first and second overlying members 60, 62 comprises a respective handle 74, 76 such that an installer can readily lift and otherwise maneuver level 1. In an exemplary embodiment, handles 74, 76 comprise an aperture through which an installer may adequately grasp level 1.

Figure 5:
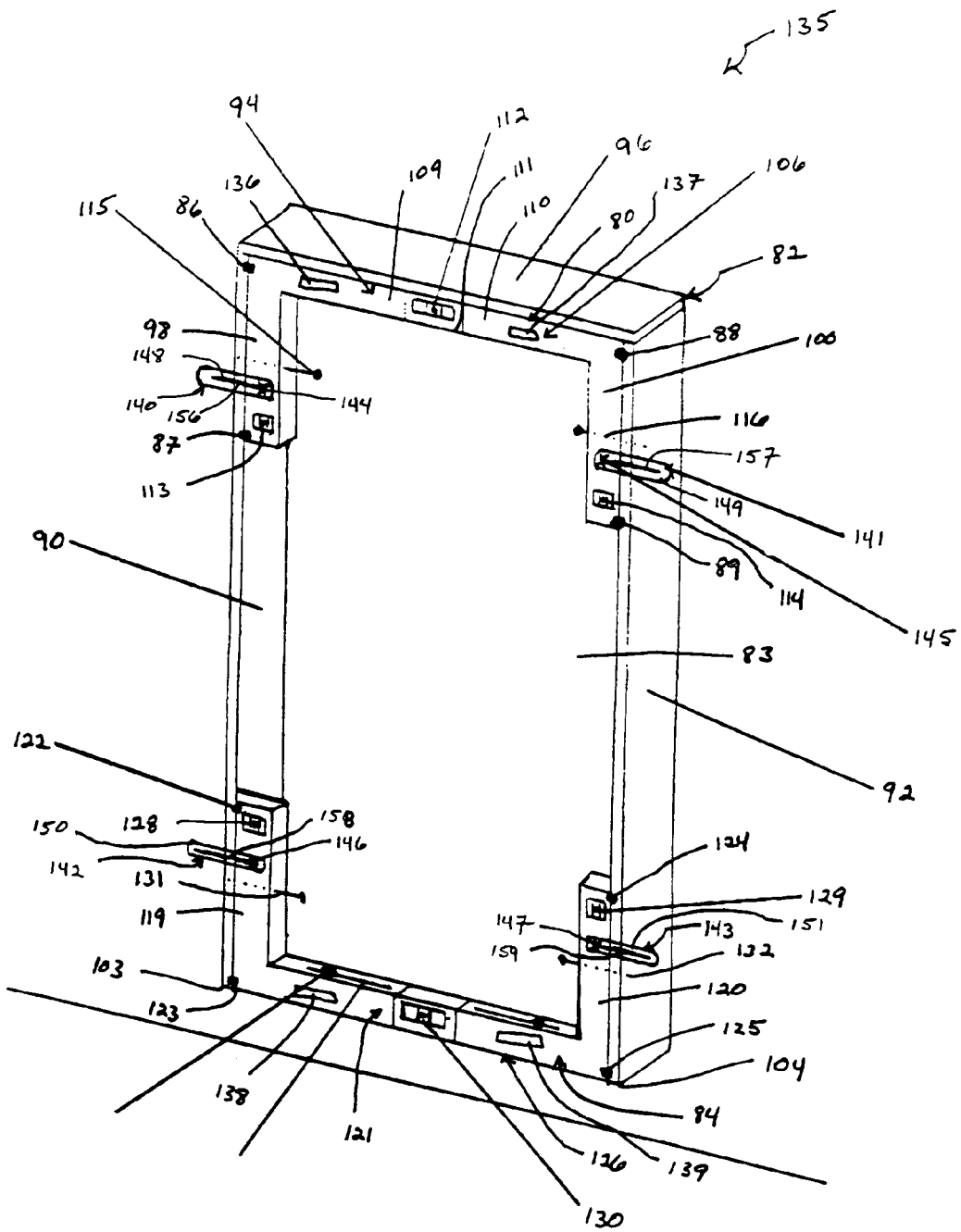
FIG. 5 is an illustration depicting an exemplary assembly comprising an exemplary level and a doorjamb.

As shown in FIG. 5, preferably two levels, as described and contemplated herein, are used to stabilize a doorjamb such that the angles of the doorjamb are maintained at a constant, wherein such constant angle is preferably 90 degrees, and the sides of the doorjamb are held rigid during the installation of the doorjamb into a wall cavity. Referring specifically to FIG. 5, a level 80 is positioned on and secured to a top portion of a doorjamb 82, and a level 84 is positioned on and secured to a bottom portion of doorjamb 82.

More specifically, level 80 may be positioned onto doorjamb 82 by inserting level 80 into a hollow 83 of doorjamb 82. Vertical components 98, 100 of level 80 are then made to contact respective vertical sides 90, 92 of doorjamb 82. Where the width of level 80 is less than the width of hollow 83 such that vertical components 98, 100 cannot contact respective vertical sides 90, 92, adjustor means 106 of level 80 may be used to increase the width of level 80.

Figure 6:
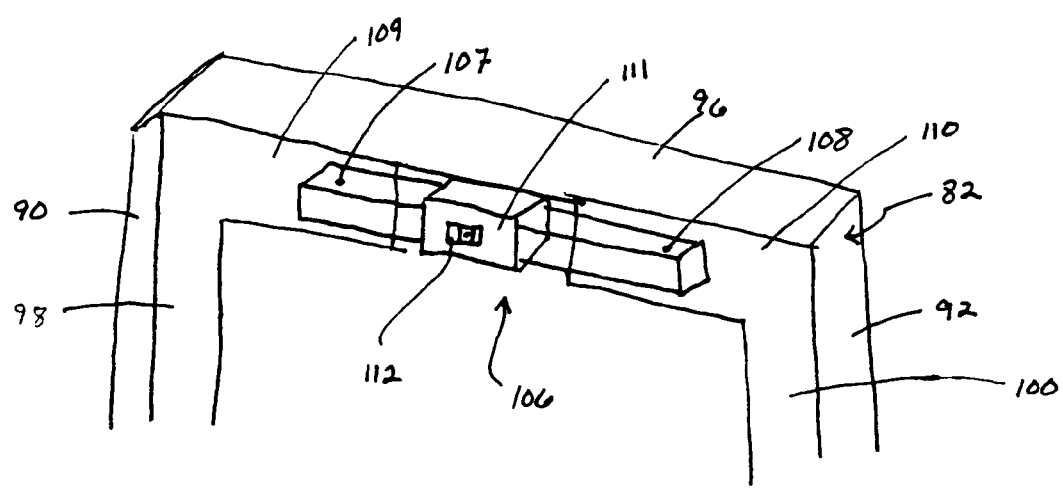
FIG. 6 is an illustration highlighting an exemplary adjustable member from the exemplary level depicted in FIG. 5.

Referring to FIG. 6, adjustor means 106 may alter the width of level 80 via the following method. Knobs (not shown) may be loosened from their respective receivers 107, 108. At least one of overlying members 109, 110 is then slid away from connector 111. Preferably, both overlying members 109, 110 are slid such that connector 111 remains centered with an upper horizontal side 96 of doorjamb 82 such that a level indicator 112 also remains centered with upper horizontal side 96. Once both vertical components 98, 100 are in contact with respective vertical sides 90, 92 of doorjamb 82, the knobs may be tightened to secure level 80 into place.

Again referring to FIG. 5, once vertical components 98, 100 are in contact, or close to contact, with vertical sides 90, 92, earmarks 86–89 are preferably aligned with respective vertical sides 91, 93 of doorjamb 82 such that each of earmarks 86–89 makes contact with respective vertical sides 90, 92. Additionally, level 80 is preferably shifted in a northerly direction until the top surface of a horizontal component 94 of level 80 is disposed onto a bottom surface of upper horizontal side 96 of doorjamb 82. After horizontal component 94 and vertical components 98, 100 of level 80 are leveled and plumbed with doorjamb 82, as indicated by level indicators 112–114, attachment screws 115, 116 are preferably inserted through respective vertical components 98, 100 and are bored partially through respective vertical sides 90, 92 of doorjamb 82.

Similarly, level 84 may be positioned onto doorjamb 82 by inserting level 84 into hollow 83 of doorjamb 82. Vertical components 119, 120 of level 84 are then made to contact respective vertical sides 90, 92 of doorjamb 82. Where the width of level 84 is less than: the width of hollow 83 such that vertical components 119, 120 cannot contact respective vertical sides 90, 92, adjustor means 121 of level 84 may be used in the same manner as described above in reference to adjustor means 106.

Once vertical components 119, 120 are in contact, or close to contact, with vertical sides 90, 92, earmarks 122–125 are preferably aligned with respective vertical sides 90, 92 of doorjamb 82 such that each of earmarks 122–125 makes contact with respective vertical sides 90, 92. Additionally, level 84 is preferably shifted in a southerly direction until a bottom surface of a horizontal component 126 of level 84 is level with terminal ends 103, 104 of vertical sides 90, 92 of doorjamb 82.

After horizontal component 126 and vertical components 119, 120 of level 84 are leveled and plumbed with doorjamb 82, as indicated by level indicators 128–130, attachment screws 131, 132 are preferably inserted through respective vertical components 119, 120 and are bored partially through respective vertical sides 90, 92 of doorjamb 82.

Having installed levels 80, 84 to doorjamb 82, the resulting assembly 135 may be positioned within a cavity in a wall, wherein a door will ultimately be placed into the cavity. An installer may grasp assembly 135 by at least one of handles 136–139 to fit assembly 135 into the cavity and to easily adjust the position of assembly 135 in the cavity.

Once assembly 135 is fitted within the cavity, vertical sides 90, 92 are made plumb with the respective vertical sides of the wall (not shown), upper horizontal side 96 is made level with the upper horizontal side of the wall (not shown), and horizontal component 126 is made level with the floor (not shown). In an exemplary embodiment, slotted assemblies 140–143 are preferably used to ensure that assembly 135 is both level and plumb with the wall. In an exemplary embodiment, adjustor elements 144–147 of slotted assemblies 140–143 are loosened such that tabs 148–151 can be slid in an east-west direction to extend outwardly to make contact with the wall (not shown). Once such contact is made, assembly 135 is again checked to determine that it is both level and plumb with the wall. If level indicators 112–114 and 128–130 indicate that assembly 135 is level and plumb with the wall, adjustor elements 144–147 may be tightened to secure assembly 135 to the wall. Additionally, securing elements (not shown) may be positioned through respective slots 156–159 and through a portion of the wall to further secure assembly 135 to the wall.

Therefore, tabs 148–151 are slotted so as to be adjustable in terms of length. Tabs 148–151 each comprise a respective horizontal slot 156–159 so that adjustor elements 144–147, which attach respective tabs 148–151 to the wall, can be movably engaged when attached to the wall so that assembly 135 can be moved around to find the level and the plumb. Thus, the installer can loosely install adjustor elements 144–147 within respective slots 156–159 so that adjustor elements 144–147 would be held temporarily until such time as level and plumb was derived; at which time adjustor elements 144–147 would be tightened within slots 156–159. Also, if the door is close to the perpendicular wall, tabs 148–151 can still be used because they will hold adjustor elements 144–147 at a closer range. Thus, tabs 148–151 are movable completely on a horizontal plane in an easterly or westerly direction to provide more versatile attachment to the wall. Slotted assemblies 140–143 will be able to hold respective adjustor elements 144–147 at a closer range. Tabs 148–151 themselves are changeable in the length that they can be at both the fixed and the outer end.

The task of installing the doorjamb is significantly simplified by installing a level as disclosed herein at both the top of the doorjamb and at the bottom of the doorjamb prior to attempting the installation of the doorjamb into the wall cavity.

Once the presently described levels are installed, the doorjamb is rigid, all four angles are fixed and immovable, and both the vertical and horizontal members of the doorjamb are immovable. This significantly assists in easing the task of leveling, plumbing and squaring the doorjamb in the wall. Securing the doorjamb can be done easily and the act of shimming the doorjamb does not impact the angles obtained. In addition, the device may remain engaged within the doorjamb while the door is hung on the hinges to insure that the door opens and closes smoothly within the doorjamb.

Furthermore, the level reduces the overall doorjamb installation time by about 70% as compared to traditional installation methods. Accordingly, the device increases the efficiency of a successful installation of a doorjamb into a wall cavity.

What is claimed is:

1. A level for installing a jamb comprising:
 a horizontal component disposable on a horizontal side of a jamb, comprising:
  a first overlying member comprising a first terminal end opposite to a second terminal end;
  a second overlying member comprising a first terminal end opposite to a second terminal end; and
  an adjustor means comprising a first terminal end opposite to a second terminal end;
 wherein the first terminal end of the adjustor means is slidably engaged with the second terminal end of the first overlying member and the second terminal end of the adjustor means is slidably engaged with the first terminal end of the second overlying member such that a length of the horizontal component is adjustable;
 a first vertical component attachable to a first vertical side of the jamb, comprising a first terminal end opposite to a second terminal end, wherein the first terminal end of the first vertical component is joined to the first terminal end of the first overlying member;
 a second vertical component attachable to a second vertical side of the jamb, comprising a first terminal end opposite to a second terminal end, wherein the first terminal end of the second vertical component is joined to the second terminal end of the second overlying member; and
 a leveling means disposed onto a surface of at least one of the first vertical component and the second vertical component, wherein the leveling means comprises a slotted assembly comprising:
  a tab comprising:
   a body having a length that extends transversely across and over the surface of the vertical component such that the tab protrudes over the respective vertical side of the jamb; and
   a slot extending along a portion of the length of the body; and
  an adjustor element slidably engaged with the slot, wherein the adjustor element can be loosened to allow the tab to be slidably moved across the vertical component, the vertical side of the jamb, and across an adjacent area of a wall to which the jamb is installed, and further wherein the adjustor element can be tightened to hold the level in position;
 wherein the level squares, levels, and plumbs the jamb.

2. The level of claim 1, wherein the leveling means comprises at least one of an earmark, a slotted assembly, and a level indicator.

3. The level of claim 1, further comprising an attachment screw born through a surface of at least one of the first vertical component and the second vertical component and through at least a portion of the respectively abutting vertical side of the jamb.

4. The level of claim 1, wherein:
 each of the first and second overlying members comprises an adjustment slot located on an undersurface of the first and second overlying members; and
 the adjustor means comprises a first receiver and a second receiver, wherein the first receiver is located on an undersurface of the adjustor means located towards the first terminal end of the adjustor means, and the second receiver is located on the undersurface of the adjustor means located towards the second terminal end of the adjustor means;

wherein the adjustment slot of the first overlying member is aligned with the first receiver and the adjustment slot of the second overlying member is aligned with the second receiver;

and further wherein, the level further comprises:
  a first knob fitted through the adjustment slot of the first overlying member and received by the first receiver; and
  a second knob fitted through the adjustment slot of the second overlying member and is received by the second receiver, wherein the first knob and the second knob adjustably fix the length of the horizontal component.

5. The level of claim 1, wherein at least one of the first overlying member and the second overlying member comprises a handle.

6. The level of claim 1, further comprising a securing element disposed in the slot of the adjustor element, wherein the securing element bores through the wall to which the level and jamb are mounted to further secure the level and the jamb to the wall.

7. An assembly comprising:
  a jamb, wherein the jamb comprises:
    a top horizontal side comprising a first terminal end and a second terminal end; and
    a first vertical side opposite to a second vertical side, wherein the first vertical side is joined to the first terminal end and the second vertical side is joined to the second terminal end;
  a first level comprising:
    a first horizontal component abutting the top horizontal side of the jamb;
    a first vertical component abutting the first vertical side of the jamb; and
    a second vertical component abutting the second vertical side of the jamb;
  wherein the first and second vertical components are connected at 90 degree angles to the first horizontal component;
  a second level comprising:
    a second horizontal component located at a bottom surface of the jamb opposite to the top horizontal side of the jamb;
    a third vertical component abutting the first vertical side of the jamb; and
    a fourth vertical component abutting the second vertical side of the jamb;
  wherein the third and fourth vertical components are connected at 90 degree angles to the second horizontal component; and further wherein each of the first and second horizontal components comprises:
    a first overlying member comprising a first terminal end opposite to a second terminal end;
    a second overlying member comprising a first terminal end opposite to a second terminal end; and
    an adjustor means comprising a first terminal end opposite to a second terminal end;
  wherein the first terminal end of the adjustor means is slidably engaged with the second terminal end of the first overlying member and the second terminal end of the adjustor means is slidably engaged with the first terminal end of the second overlying member such that a length of the first and second horizontal components is adjustable; and
  a slotted assembly positioned on at least one of the first, second, third, and fourth vertical components, wherein the slotted assembly comprises:
    a tab comprising:
      a body having a length that extends transversely across and over a surface of the vertical component such that the tab protrudes over the respective abutting vertical side of the jamb; and
      a slot extending along a portion of the length of the body; and
    an adjustor element slidably engaged with the slot, wherein the adjustor element can be loosened to allow the tab to be slidably moved across the vertical component, the vertical side of the jamb, and across an adjacent area of a wall to which the jamb is installed, and further wherein the adjustor element can be tightened to hold the level in position on the jamb.

8. The assembly of claim 7, wherein at least one of the first vertical component, the second vertical component, the third vertical component, and the fourth vertical component of the respective first level and second level further comprises an earmark and a level indicator disposed on a surface of the respective vertical component(s).

9. The assembly of claim 7, wherein at least one of the first vertical component, the second vertical component, the third vertical component, and the fourth vertical component of the respective first level and second level further comprises an attachment screw bored through the respective vertical component, wherein the attachment screw also bores through the respective first and second vertical sides of the jamb.

10. The assembly of claim 7, wherein
  each of the first and second overlying members of the first and second horizontal components further comprises an adjustment slot located on the undersurface of the first and second overlying members; and
the adjustor means comprises a first receiver and a second receiver, wherein the first receiver is located on an undersurface of the adjustor means located towards the first terminal end of the adjustor means, and the second receiver is located on the undersurface of the adjustor means located towards the second terminal end of the adjustor means;
wherein the adjustment slot of the second overlying member is aligned with the second receiver;
and further wherein, the level further comprises:
  a first knob fitted through the adjustment slot of the first overlying member and received by the first receiver, and a second knob fitted through the adjustment slot of the second overlying member and received by the second receiver, wherein the first knob and the second knob adjustably fix the length of the horizontal component.

11. The level of claim 7, further comprising a securing element disposed in the slot of the adjustor element, wherein the securing element bores through the wall to which the level and jamb are mounted to further secure the level and the jamb to the wall.

12. A level for use on a jamb, comprising:
  a mounting means for mounting the level on the jamb prior to installation of the jamb to a wall, wherein the means comprises:
    a horizontal component comprising an adjustable length such that the level can be mounted to different sized jambs; and
    a slotted assembly located on at least one of two vertical components of the level, wherein the slotted assembly secures the level to the jamb, and allows for a continuous adjustment of the jamb after the jamb is installed to the wall, wherein the continuous adjustment occurs until the jamb is level and plumb with the wall.

13. The level of claim 12, wherein the slotted assembly comprises:
   a tab comprising:
      a body having a length that extends transversely across and over a surface of the vertical component such that the tab protrudes over a vertical side of the jamb; and
      a slot extending along a portion of the length of the body; and
   an adjustor element slidably engaged with the slot, wherein the adjustor element can be loosened to allow the tab to be slidably moved across the vertical component, the vertical side of the jamb, and across an adjacent area of the wall to which the jamb is installed, and further wherein the adjustor element can be tightened to hold the level in position.

14. The level of claim 12, wherein the horizontal component comprises:
   a first overlying member comprising a first terminal end opposite to a second terminal end;
   a second overlying member comprising a first terminal end opposite to a second terminal end; and
   an adjustor means comprising a first terminal end opposite to a second terminal end;
wherein the first terminal end of the adjustor means is slidably engaged with the second terminal end of the first overlying member and the second terminal end of the adjustor means is slidably engaged with the first terminal end of the second overlying member.

* * * * *